United States Patent

Gallo

[19]

[11] Patent Number: 6,016,384
[45] Date of Patent: Jan. 18, 2000

[54] METHOD FOR SPEEDING UP THE CONVERGENCE OF THE BACK-PROPAGATION ALGORITHM APPLIED TO REALIZE THE LEARNING PROCESS IN A NEURAL NETWORK OF THE MULTILAYER PERCEPTRON TYPE

[75] Inventor: Girolamo Gallo, Foggia, Italy

[73] Assignee: Texas Instruments Incorporated, Dallas, Tex.

[21] Appl. No.: 08/396,361

[22] Filed: Feb. 28, 1995

Related U.S. Application Data

[63] Continuation of application No. 07/872,778, Apr. 23, 1992, abandoned.

[30]    Foreign Application Priority Data

May 7, 1991   [IT]   Italy ................................ RM91A0302

[51] Int. Cl.$^7$ ........................................................ G06F 15/18
[52] U.S. Cl. ............................................................. 395/23
[58] Field of Search ................................................ 395/23

[56]               References Cited

U.S. PATENT DOCUMENTS

| | | | |
|---|---|---|---|
| 4,805,225 | 2/1989 | Clark ......................................... | 395/21 |
| 5,052,043 | 9/1991 | Gaborski .................................. | 382/27 |
| 5,060,279 | 10/1991 | Crawford .................................. | 395/20 |
| 5,218,529 | 6/1993 | Meyer et al. ....................... | 364/413.01 |

OTHER PUBLICATIONS

K.A. Marko et al., "Automotive Diagnostic Using Trainable Classifers: Statistical Testing and Paradigm Selection," IJCNN–90, pp. I–33 to I–38, Jun. 1990.

M. Caudill, "Using Neural Nets: Diagnostic Expert Nets," AI Expert, pp. 43–47, Sep. 1990.

Gallant, "Perceptron–Based Learning Algorithms", IEEE Transactions on Neural Networks, vol. 1 No. 2, Jun. 1990.

Nguyen et al "A New LMS–Bared Algorithm for Rapid Adaptive Classification in Dynamic Environments: Theory and Preliminary Results" IEEE Int'l Conf on Neural Networks, Jul. 24–27 1988 p. 455–63 vol. 1.

*Primary Examiner*—Robert W. Downs
*Attorney, Agent, or Firm*—William E. Hiller; Richard L. Donaldson

[57]                ABSTRACT

A method for speeding up the convergence of the back-propagation algorithm applied to realize the learning process in a neural network of the multilayer perceptron type intended for instance to recognize a set of samples. The method comprises a first stage based upon the elementary concept of progressively increasing the capability for learning of the network by progressively adding new samples as they are recognized by the network to a starting set of learning samples; a second stage based upon the concept of progressively increasing the learning capabilities of the network by progressively adding not previously recognized samples; and a third stage based upon the concept of progressively increasing the learning capabilities of the network by progressive corruption in the meaning of the assimilation between recognized samples and not recognized samples and their subsequent exposure to the network.

9 Claims, 1 Drawing Sheet

METHOD FOR SPEEDING UP THE CONVERGENCE OF THE BACK-PROPAGATION ALGORITHM APPLIED TO REALIZE THE LEARNING PROCESS IN A NEURAL NETWORK OF THE MULTILAYER PERCEPTRON TYPE

This application is a Continuation of application Ser. No. 07/872,778, filed Apr. 23, 1992, now abandoned.

BACKGROUND OF THE INVENTION

The present invention generally relates to the so-called neural or neuronic networks, that is to say to those electronic networks built and operationally organized in analogy to the animal or human brain.

As is known, such networks once built can be considered as a classic, not already programmed computer, in the meaning that, in order to perform any function, they are first of all to be trained to perform it. For instance, if a neural network is to be employed in an apparatus for the character or generally pattern or object recognition which represent one of the typical applications in which a neural network shows its superiority with respect to a classic computer, it has to be first trained to recognize the characters, the shapes or the object. This stage is defined the "learning" stage.

In practice, considering that a neural network has as its basic components the "neurons" and the "synapses" and that the "synapses" are characterized by a "weight",the learning stage consists in imparting to all the synapses of the network the suitable "weights" such that the network recognizes the characters, the patterns or the objects and gives an exact response that therefore coincides with the desired one.

In the multilayer perceptron neural networks the learning stage is commonly realized by means of a "back-propagation" algorithm. An iterative procedure is dealt with, carried out with the aid of a learning computer, during which to the network a number is presented of patterns of the characters, of the shapes or of the objects that it will have to be able to recognize. Not only the responses that the neural network provides, but the exact responses, i.e. those that one desires to obtain too, are provided to the computer. The object of the learning iterative procedure is to reach, by subsequent approximations, a configuration of the synaptic weights with which the difference turns out to be zero (at the theoretic limit), or otherwise at a minimum, between the desired output (target) configurations, i.e. the exact response, and those that the network provides little by little correspondingly to the single configurations that make up the learning configuration set. This minimization of the differences is known under the term of the "convergence" of the configurations.

As is known, the efficiency of the recognition process depends on the number of models or samples ("patterns") presented to the network during the learning stage. However, the number of the iterations necessary for the achievement of the convergence considerably increases as the number of the samples increases, becoming so high (sometimes up to 100,000 ) as to require very long simulation times, even when very powerful computing machines are used.

Another problem resulting from the use of such a multiplication of the number of the iterations is that of the so-called "endurance", i.e. the maximum number of exceeding reprogrammings to which an EEPROM memory cell may be subjected when relied upon as a backup to store synaptic weights according to the teaching of U.S. Pat. No. 5,274,743 which issued Dec. 28, 1993 from U.S. application Ser. No. 828,062 filed Jan. 30, 1992.

However, the problem is dealt with by speeding up the learning process and by reducing the number of the iterations necessary to achieve the convergence of the back-propagation algorithm. Several techniques have been suggested to this end.

However, a brief outline about the back-propagation algorithm is considered to be timely before proceeding to examine such techniques.

In the back-propagation algorithm, the weights are generally initialized at random values. Given an input vector $I_p$ an output vector $O_p$ is obtained. Such a vector is compared with the vector that corresponds to the desired response, $T_p$, and the corrections are computed to be operated on the weights of the synapses of the neurons of the output (out) layer.

To this end, the quantities:

$$\delta_{p,\,out,\,j} = (T_{pj} - O_{p,out,j}) O_{p,out,j}(1 - O_{p,\,out,\,j}) \quad (1)$$

are computed, $O_{p,out,j}(1 - O_{p,out,j})$ being the derivative of the activation (sigmoid) function.

In Formula (1), the first index refers to the sample or "pattern" (p), the second to the layer (out) and the third to the output of the neuron (j).

For the other layers one uses the relations:

$$\delta_{p,k,j} = \sum_{i=1}^{s_k} \delta_{p,(k+1),i} W_{(k+1),ij} O_{p,k,j}(1 - O_{p,k,j})$$

$S_k$ being the number of the neurons of the $k^{th}$ layer and $W_{(k+1),ij}$ being the weight with which the $i^{th}$ neuron of the $(k+1)^{th}$ layer filters the $j^{th}$ input.

Once all the δ are known, one is able to compute the corrections that are to be operated on the weights $$\Delta W_{kij} = \eta \sum_p \delta_{p,k,i} O_{p,(k-1),j} + \alpha \Delta W_{kij}\star$$

η and α being constants and $\Delta W_{kij}*$ being that obtained by the preceding iteration.

The convergence condition is, for all the outputs and all the samples or "patterns"

$${}_{p,j}^{max}|T_{p,j} - O_{p,out,j}| \leq \epsilon$$

where

ε is a suitably selected value.

In order to minimize the number of the necessary iterations, it has been suggested that the update of the synaptic weights relevant to each iteration be carried out after the presentation of the whole learning set ("learning by epoch", i.e. "set learning") instead of after the presentation of each sample ("learning by pattern", i.e. "sample learning"). It has also been proved that the convergence properties of the algorithm considerably improve if the parameters η and α are updated each time allowing for the result of the preceding iteration.

Generally, interest has been shown with respect to the problem of eliminating the local minimums of the function to be minimized, in order to limit the risk of a possible "saturation" of the learning process.

It is an object of the present invention to provide a learning process that avoids the difficulties mentioned above and makes possible a rapid achievement of the convergence condition of the back-propagation algorithm, even with a very numerous set of samples.

The learning process in accordance with the present invention, is not a further reedition of the back-propagation algorithm, but establishes some original criteria for the application of the above-mentioned algorithm, based upon iterative techniques for the presentation of the learning samples or patterns to the neural network.

SUMMARY OF THE INVENTION

The object set out previously is achieved according to the present invention by a method for speeding up the convergence of the back-propagation algorithm applied to realize the learning process of a neural network of the multilayer perceptron type, intended to recognize a set of samples, which method comprises a first stage for progressively increasing the learning capability of the network by adding new samples as they are recognized by the network to an initial set of learning samples; a second stage for progressively increasing the learning capability of the network by progressively adding previously unrecognized samples as the previously unrecognized samples are recognized to the set of already recognized samples, and a third stage for progressively increasing the learning capability of the network by progressively corrupting sample values, in the sense of the assimilation between recognized samples and unrecognized samples and their subsequent exposure to the network.

Further particularities and advantages of the present invention will turn out to be apparent by the following disclosure with reference to the annexed drawings in which the preferred embodiment is shown as a matter of example and not of restriction.

DESCRIPTION OF PREFERRED EMBODIMENTS

With reference now to the drawings, a detailed disclosure of the process will be given.

I STAGE (FIG. 1)

From the set of characters or configurations or objects that make up the learning set, one extracts a number of as much as possible statistically significant "patterns", that will make up the initial learning set. This subset will have to be as much as possible numerous, consistent with the necessity of reaching the convergence within a reasonable time (a few thousands of operations, as a maximum). Then, one performs a learning operation and then a recognition operation on the whole set. If, besides the initial subset, new "patterns" are recognized, then these new recognized "patterns" are added to the subset of the previously recognized "patterns". Then one performs a new cycle of learning and recognition on the whole set, reiterating until no increase is obtained of the number of the "patterns" recognized by the network.

In practice, one checks if, by adding recognized "patterns", the learning and recognition capability increases. When no new recognized "pattern" is found, one passes to the II Stage.

II STAGE (FIG. 2)

The "patterns" that at the end of the preceding stage are not recognized by the network, are added one at a time to the current learning subset, executing a learning operation each time. If a convergence condition is fulfilled within a restricted number of iterations, as for instance one hundred, the added "pattern" is confirmed to belong to the current learning subset; otherwise, the "pattern" is momentarily set aside and the process is repeated with a new "pattern".

Figure 1:
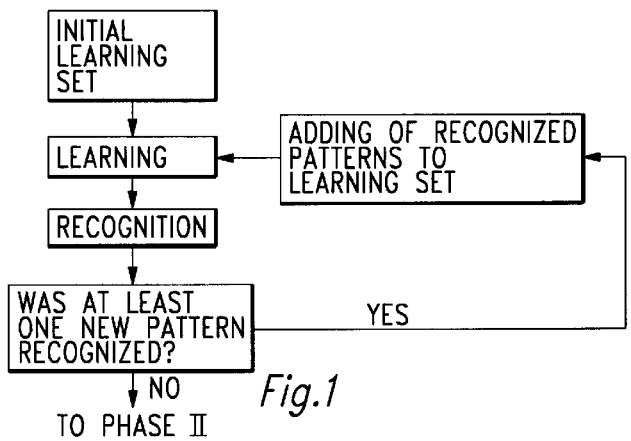
FIG. 1 graphically shows the set of operations that make up the first stage of the process.
Figure 2:
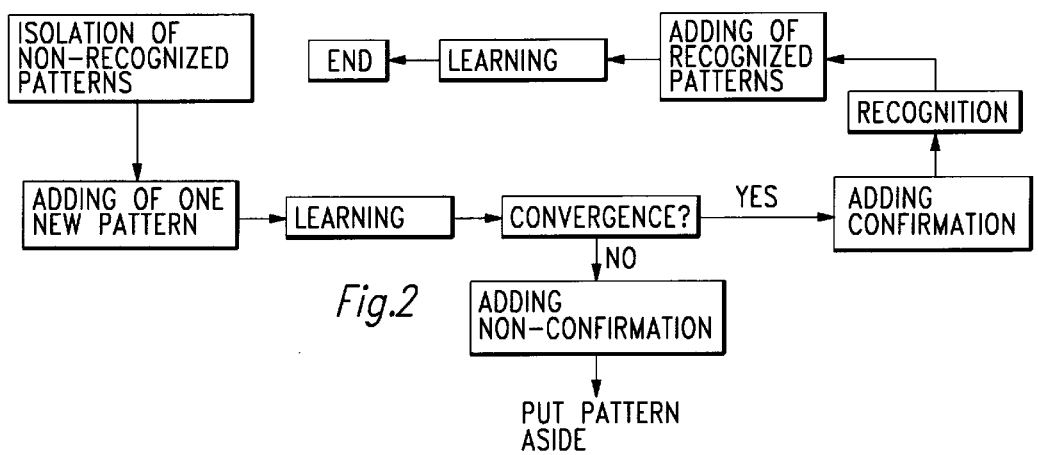
FIG. 2 graphically shows the set of operations that make up the second stage of the process.

As is seen in FIG. 2, whenever the convergence takes place and therefore the added "pattern" is confirmed as belonging to the current learning subset, the first stage is repeated, that is to say a recognition operation is performed on the whole set, then an operation for the addition of the possible other recognized "patterns" and thus a new learning operation is performed.

This stage is performed iteratively on all of the recognized "patterns". At the conclusion of the second stage, if unrecognized "patterns" no longer exist, the learning process can be considered to be concluded.

If, on the contrary, unrecognized "patterns" still exist, then one proceeds with the third stage.

III STAGE (FIG. 3)

The III Stage can be performed in two distinct modes, both based upon the concept of the "corruption", that is to say the modification of a few pixels of the character, configuration or image of the object.

Figure 3:
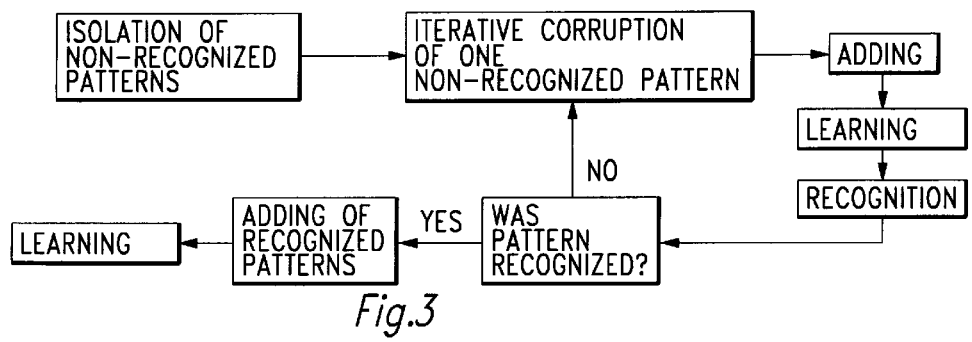
FIG. 3 graphically shows the set of operations that make up the third stage of the process.

In a first execution mode, represented in FIG. 3, after isolating all the "patterns" that turn out to be unrecognized at the conclusion of the I and II Stages, such non-recognized "patterns" are subjected to an iterative corruption, one at a time. In particular, one corrupts a non-recognized "pattern" in the meaning of its assimilation to an already recognized "pattern" and one adds it to the current learning set executing, therefore, a learning operation. Then one performs an operation for recognizing the corrupted non-recognized "pattern": if the corrupted non recognized "pattern" isn't recognized, one subjects the already corrupted "pattern" to a new corruption in the same meaning indicated above and proceeds in the same way with adding, learning and recognition operations, reiterating with subsequent corruptions until such originally non-recognized "pattern" is on the contrary recognized. At this point, the "pattern" at hand is added to the subset of the recognized "patterns" and a learning operation is performed. One proceeds in this way for all of the remaining unrecognized "patterns".

In a second (not represented) execution mode, the "patterns" that made up the initial learning set are gradually corrupted, in the sense of their assimilation to the non-recognized "patterns", set aside by the preceding stage. At each corruption, the learning process is repeated, obtaining the convergence within a few tens of iterations. Such a procedure is repeated until the network is able to recognize the previously refused "patterns".

In this case also, as already in the III Stage, the new "patterns" possibly recognized at the end of each iteration are added to the current learning set.

The disclosed process has been applied to a neural net of the perceptron type, in two layers, with 32 neurons on the first layer and 10 neurons on the second layer, using a learning set of about 500 "patterns". The convergence condition has been reached by executing about 700 iterations (with $\eta=0,2$ and $\alpha=0$) on the whole. Otherwise, presenting to the network the whole learning set, 100,000 iterations would not have been sufficient to reach the convergence.

In the above description preferred embodiments of the present invention have been disclosed, but it is to be understood that those persons skilled in the art will be able to make modifications and variations in the succession and in the combination of the operations with respect to the method, without departing from the scope of the claims.

What is claimed is:

1. A learning method for developing patterns to be incorporated into a neural network of the multi-layer perceptron type intended to recognize a set of sample patterns in which back-propagation is relied upon to change network weights during training, wherein convergence as between input patterns to be recognized and existing patterns of the neural network is speeded up, said learning method comprising:

increasing the learning capability of the neural network in a first stage by:

extracting an initial set of patterns as a selected subset from a set of patterns making up the complete learning set of patterns to be processed during a training phase, and providing the initial set of patterns to the neural network, operating on the complete learning set of patterns including the initial set of patterns as provided to the neural network in accordance with a learning program, progressively adding new patterns to the initial set of patterns as the new patterns are recognized by the neural network, reiterating the operation of the learning program on the complete learning set of patterns, further adding new patterns as recognized to the subset of the previously recognized patterns as defined by the initial set of patterns and all new recognized patterns as added thereto, and repeating the iteration of the operation of the learning program and the adding of new patterns as recognized to the subset of the previously recognized patterns until no new patterns are recognized by the neural network in completing the first stage of the learning method;

increasing the learning capability of the neural network in a second stage by progressively adding previously unrecognized patterns to the subset of previously recognized patterns as the previously unrecognized patterns are recognized; and increasing the learning capability of the neural network in a third stage by progressively corrupting unrecognized patterns in the assimilation of such unrecognized patterns with previously recognized patterns until the corrupted unrecognized patterns are recognized and then progressively adding the corrupted unrecognized patterns as recognized to the subset of previously recognized patterns.

2. A learning method as set forth in claim 1 wherein the provision of an initial set of patterns to the neural network as a selected subset extracted from a set of patterns making up the complete learning set of patterns to be processed during the training phase is accomplished by selecting a subset of patterns at least a substantial number of which are statistically significant in relation to the complete learning set of patterns.

3. A learning method as set forth in claim 1, wherein the operation on the complete learning set of patterns including the extracted initial set of patterns in accordance with a learning program includes learning the initial set of patterns as extracted from the complete learning set of patterns, and thereafter subjecting the complete learning set of patterns including the initial set of patterns to a recognition procedure.

4. A learning method for developing patterns to be incorporated into a neural network of the multi-layer perceptron type intended to recognize a set of sample patterns in which back-propagation is relied upon to change network weights during training, wherein convergence as between input patterns to be recognized and existing patterns of the neural network is speeded up, said learning method comprising:

increasing the learning capability of the neural network in a first stage by:

extracting an initial set of patterns as a selected subset from a set of patterns making up the complete learning set of patterns to be processed during a training phase, and providing the initial set of patterns to the neural network, operating on the complete learning set of patterns including the initial set of patterns as provided to the neural network in accordance with a learning program, progressively adding new patterns to the initial set of patterns as the new patterns are recognized by the neural network, reiterating the operation of the learning program on the complete learning set of patterns, further adding new patterns as recognized to the subset of the previously recognized patterns as defined by the initial set of patterns and all new recognized patterns as added thereto, and repeating the iteration of the operation of the learning program and the adding of new patterns as recognized to the subset of the previously recognized patterns until no new patterns are recognized by the neural network in completing the first stage of the learning method;

increasing the learning capability of the neural network in a second stage by:

isolating the patterns not recognized by the neural network at the conclusion of the first stage, adding an unrecognized pattern to the subset of the previously recognized patterns, operating on the subset of the previously recognized patterns with the unrecognized pattern added thereto in accordance with the learning program, iterating the operation of the learning program within a predetermined number of iterations until convergence occurs as between the heretofore unrecognized pattern and the current set of previously recognized patterns as defined by the initial set of patterns and all previously recognized patterns added thereto, adding the unrecognized pattern to the current set of the previously recognized patterns, returning to the first stage of the learning method by operating on the complete learning set of patterns, progressively adding new patterns to the current set of previously recognized patterns as the new patterns are recognized by the neural network, reiterating the operation of the learning program on the complete learning set of patterns, setting the unrecognized pattern aside on condition that no convergence occurs after a predetermined number of iterations of the operation on the current set of previously recognized patterns with the unrecognized pattern added thereto, and repeating the adding of an unrecognized pattern and the operation of the learning program on the current set of previously recognized patterns with the unrecognized pattern added thereto for all of the unrecognized patterns as determined at the conclusion of the first stage; and increasing the learning capability of the neural network in a third stage by progressively corrupting unrecognized patterns in the assimilation of such unrecognized patterns with previously recognized patterns until the corrupted unrecognized patterns are recognized and then progressively adding the corrupted unrecognized patterns as recognized to the subset of previously recognized patterns.

5. A learning method as set forth in claim 4, wherein the operation on the complete learning set of patterns including the extracted initial set of patterns in accordance with a learning program includes learning the initial set of patterns as extracted from the complete learning set of patterns, and thereafter subjecting the complete learning set of patterns including the initial set of patterns to a recognition procedure.

6. A learning method for developing patterns to be incorporated into a neural network of the multi-layer perceptron type intended to recognize a set of sample patterns in which back-propagation is relied upon to change network weights during training, wherein convergence as between input patterns to be recognized and existing patterns of the neural network is speeded up, said learning method comprising:

increasing the learning capability of the neural network in a first stage by:

extracting an initial set of patterns as a selected subset from a set of patterns making up the complete learning set of patterns to be processed during a training phase, and providing the initial set of patterns to the neural network, operating on the complete learning set of patterns including the initial set of patterns as provided to the neural network in accordance with a learning program, progressively adding new patterns to the initial set of patterns as the new patterns are recognized by the neural network, reiterating the operation of the learning program on the complete learning set of patterns, further adding new patterns as recognized to the subset of the previously recognized patterns as defined by the initial set of patterns and all new recognized patterns as added thereto, and repeating the iteration of the operation of the learning program and the adding of new patterns as recognized to the subset of the previously recognized patterns until no new patterns are recognized by the neural network in completing the first stage of the learning method;

increasing the learning capability of the neural network in a second stage by progressively adding previously unrecognized patterns to the subset of previously recognized patterns as the previously unrecognized patterns are recognized; and increasing the learning capability of the neural network in a third stage by:

isolating the patterns not recognized by the neural network at the conclusion of the second stage, corrupting an unrecognized pattern in the assimilation of such unrecognized pattern with respect to previously recognized patterns and adding the corrupted unrecognized pattern to the current set of previously recognized patterns as defined by the initial set of patterns and all previously recognized patterns added thereto, operating on the current set of previously recognized patterns with the corrupted unrecognized pattern added thereto in accordance with the learning program, attempting a recognition of the corrupted unrecognized pattern, adding the corrupted unrecognized pattern in response to the recognition thereof to the current set of previously recognized patterns, operating on the complete learning set of patterns including the current set of previously recognized patterns with the recognized corrupted unrecognized pattern added thereto in accordance with the leaning program, and iteratively repeating the corruption of an unrecognized pattern, the operation of the learning program, the attempt to recognize the corrupted unrecognized pattern, the addition of the recognized corrupted unrecognized pattern to the previously recognized patterns, and the operation on the complete learning set of patterns until each unrecognized pattern as a corrupted unrecognized pattern is recognized.

7. A learning method as set forth in claim 6, wherein the operation on the complete learning set of patterns including the extracted initial set of patterns in accordance with a learning program includes learning the initial set of patterns as extracted from the complete learning set of patterns, and thereafter subjecting the complete learning set of patterns including the initial set of patterns to a recognition procedure.

8. A learning method for developing patterns to be incorporated into a neural network of the multi-layer perceptron type intended to recognize a set of sample patterns in which back-propagation is relied upon to change network weights during training, wherein convergence as between input patterns to be recognized and existing patterns of the neural network is speeded up, said learning method comprising:

increasing the learning capability of the neural network in a first stage by:

extracting an initial set of patterns as a selected subset from a set of patterns making up the complete learning set of patterns to be processed during a training phase, and providing the initial set of patterns to the neural network, operating on the complete learning set of patterns including the initial set of patterns as provided to the neural network in accordance with a learning program, progressively adding new patterns to the initial set of patterns as the new patterns are recognized by the neural network, reiterating the operation of the learning program on the complete learning set of patterns, further adding new patterns as recognized to the subset of the previously recognized patterns as defined by the initial set of patterns and all new recognized patterns as added thereto, and repeating the iteration of the operation of the learning program and the adding of new patterns as recognized to the subset of the previously recognized patterns until no new patterns are recognized by the neural network in completing the first stage of the learning method;

increasing the learning capability of the neural network in a second stage by progressively adding previously unrecognized patterns to the subset of previously unrecognized patterns as the previously unrecognized patterns are recognized; and increasing the learning capability of the neural network in a third stage by:

isolating the patterns not recognized by the neural network at the conclusion of the second stage, subjecting the patterns of the initial set of patterns provided to the neural network to gradual corruption in relation to their assimilation to the unrecognized patterns isolated at the conclusion of the second stage, operating on the current set of recognized patterns as defined by the initial set of patterns and all previously recognized patterns added thereto at each corruption thereof in accordance with the learning program, attempting a recognition of the unrecognized pattern, adding the unrecognized pattern upon recognition thereof to the corrupted current set of previously recognized patterns, operating on the complete learning set of patterns including the current set of previously recognized patterns with the now recognized pattern as added thereto in accordance with the learning program, iterating the subjection of the patterns of the initial set of patterns provided to the neural network to a further corruption, operating on the current set of further corrupted previously recognized patterns with the learning program, attempting a recognition of the unrecognized pattern, adding the unrecognized pattern, if recognized, to the corrupted current set of previously recognized patterns, and operating on the complete learning set of patterns including the current set of recognized patterns in accordance with the learning program, iteratively repeating the further corruption of the patterns of the initial set of patterns provided to the neural network, the operation on the current set of further corrupted previously recognized patterns with the learning program, the attempt to recognize the previously unrecognized pattern, the addition of the unrecognized pattern, if recognized, to the corrupted current set of previously recognized patterns, the operation on the complete learning set of patterns including the current set of recognized patterns in accordance with the learning program, and iteratively repeating the operations of the third stage for each of the unrecognized patterns as isolated at the conclusion of the second stage.

9. A learning method as set forth in claim 8, wherein the operation on the complete learning set of patterns including the extracted initial set of patterns in accordance with a learning program includes learning the initial set of patterns as extracted from the complete learning set of patterns, and thereafter subjecting the complete learning set of patterns including the initial set of patterns to a recognition procedure.

\* \* \* \* \*